United States Patent [19]
Solis, Jr.

[11] Patent Number: 5,631,628
[45] Date of Patent: May 20, 1997

[54] SAFETY BRAKE LIGHT FOR HIGH PROFILE VEHICLE

[76] Inventor: Rene G. Solis, Jr., P.O. Box 90057, San Bernardino, Calif. 92427

[21] Appl. No.: 654,087

[22] Filed: May 28, 1996

[51] Int. Cl.⁶ ............................................. B60Q 1/44
[52] U.S. Cl. ........................ 340/479; 362/80; 340/431
[58] Field of Search .............................. 340/479, 468, 340/470, 471, 472, 475, 431, 433, 463; 362/80, 81, 82, 83, 83.3

[56] References Cited

U.S. PATENT DOCUMENTS

| | | | |
|---|---|---|---|
| 3,784,974 | 1/1974 | Hamashige | 340/464 |
| 3,947,815 | 3/1976 | Muncheryan | 340/468 |
| 4,024,497 | 5/1977 | Ruppel et al. | 340/431 |
| 4,857,807 | 8/1989 | Hargis | 340/431 |
| 4,859,982 | 8/1989 | Seaburg | 340/475 |
| 4,894,640 | 1/1990 | Beasley et al. | 340/479 |
| 4,903,174 | 2/1990 | Busby | 340/431 |
| 5,072,340 | 12/1991 | Jones | 362/80 |
| 5,422,623 | 6/1995 | Bader et al. | 340/472 |
| 5,497,304 | 3/1996 | Caine | 362/80 |

*Primary Examiner*—Jeffery Hofsass
*Assistant Examiner*—Mohammed R. Ghannam

[57] ABSTRACT

A safety brake light for high profile vehicle including a plurality of lights. Two of the lights are secured on opposing sides of a trailer of a high profile vehicle at a level consistent with eye level of passenger vehicles and positioning two of the lights on opposing sides of the high profile vehicle at a level consistent with eye level of trucks and buses.

1 Claim, 3 Drawing Sheets

SAFETY BRAKE LIGHT FOR HIGH PROFILE VEHICLE

BACKGROUND OF THE INVENTION

1. Field of the Invention

The present invention relates to a safety brake light for high profile vehicle and more particularly pertains to providing additional warnings that a vehicle is signaling or stopping with a safety brake light for high profile vehicle.

2. Description of the Prior Art

The use of brake light attachments is known in the prior art. More specifically, brake light attachments heretofore devised and utilized for the purpose of providing additional brake lights are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,800,471 to Lippert discloses a brake light attachment.

U.S. Pat. No. 5,408,216 to Klaiber et al. discloses a brake light device for motor vehicle.

U.S. Pat. No. 5,389,823 to Hopkins et al. discloses a brake and turn signal adaptor for trailers.

U.S. Pat. No. 5,030,938 to Bondzeit discloses a universal trailer lighting adapter.

U.S. Pat. No. 4,006,453 to Bryant discloses a dual directional and brake light control for trailers.

U.S. Pat. No. Design. 345,023 to Janasiak discloses the ornamental design for a front end mounted vehicle brake light.

While these devices fulfill their respective, particular objective and requirements, the aforementioned patents do not describe a safety brake light for high profile vehicle for providing additional warnings that a vehicle is signaling or stopping.

In this respect, the safety brake light for high profile vehicle according to the present invention substantially departs from the conventional concepts and designs of the prior art, and in doing so provides an apparatus primarily developed for the purpose of providing additional warnings that a vehicle is signaling or stopping.

Therefore, it can be appreciated that there exists a continuing need for new and improved safety brake light for high profile vehicle which can be used for providing additional warnings that a vehicle is signaling or stopping. In this regard, the present invention substantially fulfills this need.

SUMMARY OF THE INVENTION

In the view of the foregoing disadvantages inherent in the known types of brake light attachments now present in the prior art, the present invention provides an improved safety brake light for high profile vehicle. As such, the general purpose of the present invention, which will be described subsequently in greater detail, is to provide a new and improved safety brake light for high profile vehicle and method which has all the advantages of the prior art and none of the disadvantages.

To attain this, the present invention essentially comprises a truck having a trailer extending rearwardly therefrom. The system includes a plurality of lights. Each of the lights includes a housing. The housing has a generally elongated triangular configuration. The housing has a flat interior surface, a curved exterior surface, and an open rear surface. The open rear surface has a cover removably secured thereto. The housing includes an intermediate wall disposed inwardly of the open rear surface. Each of the lights has a plurality of light bulbs secured within the intermediate wall in vertical alignment. The plurality of light bulbs are coupled to a central wire extending outwardly of the housing. A pair of securement bolts extend outwardly of the flat interior surface for securement to the trailer of the truck. The system includes positioning two of the lights on opposing sides of the trailer of the truck at a level consistent with eye level of passenger vehicles and positioning two of the lights on opposing sides of the truck at a level consistent with eye level of trucks and buses.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved safety brake light for high profile vehicle which has all the advantages of the prior art brake light attachments and none of the disadvantages.

It is another object of the present invention to provide a new and improved safety brake light for high profile vehicle which may be easily and efficiently manufactured and marketed.

It is a further object of the present invention to provide a new and improved safety brake light for high profile vehicle which is of durable and reliable construction.

An even further object of the present invention is to provide a new and improved safety brake light for high profile vehicle which is susceptible of a low cost of manufacture with regard to both materials and labor, and which accordingly is then susceptible of low prices of sale to the consuming public, thereby making such a safety brake light for high profile vehicle economically available to the buying public.

Still yet another object of the present invention is to provide a new and improved safety brake light for high profile vehicle which provides in the apparatuses and methods of the prior art some of the advantages thereof, while simultaneously overcoming some of the disadvantages normally associated therewith.

Even still another object of the present invention is to provide a new and improved safety brake light for high profile vehicle for providing additional warnings that a vehicle is signaling or stopping.

Lastly, it is an object of the present invention to provide a new and improved safety brake light for high profile vehicle including a plurality of lights. Two of the lights are secured on opposing sides of a trailer of a high profile vehicle at a level consistent with eye level of passenger vehicles and positioning two of the lights on opposing sides of the high profile vehicle at a level consistent with eye level of trucks and buses.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
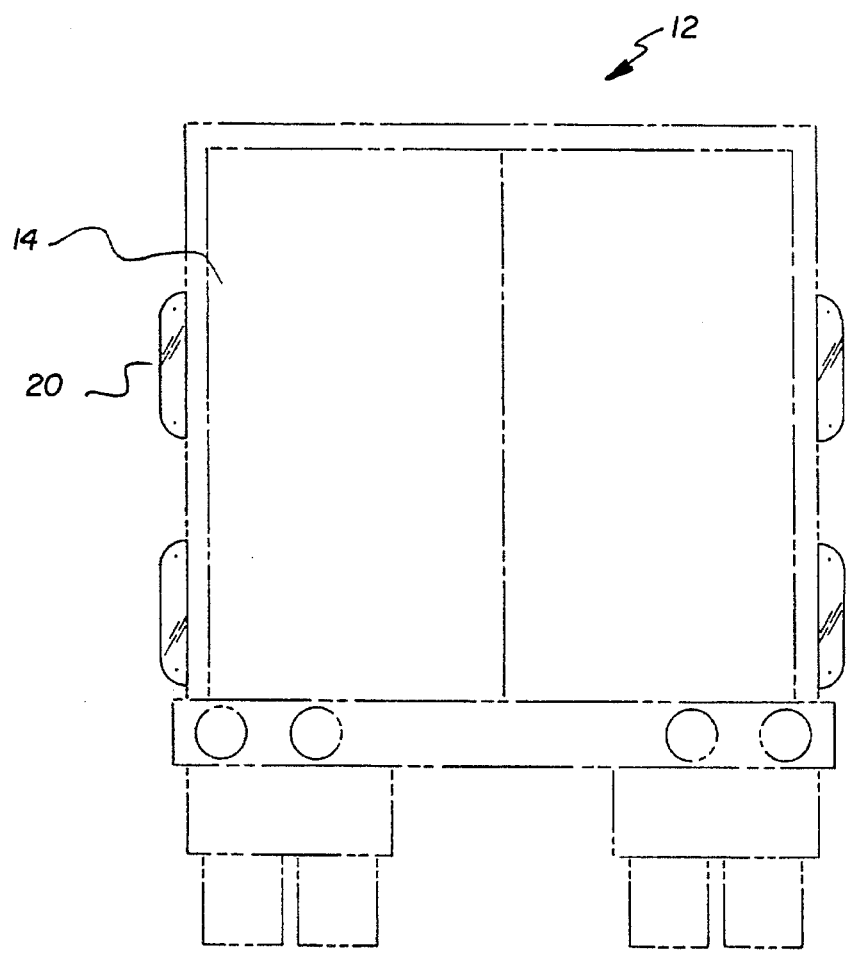
FIG. 1 is a rear view of the preferred embodiment of the safety brake light for high profile vehicle constructed in accordance with the principles of the present invention.
Figure 2:
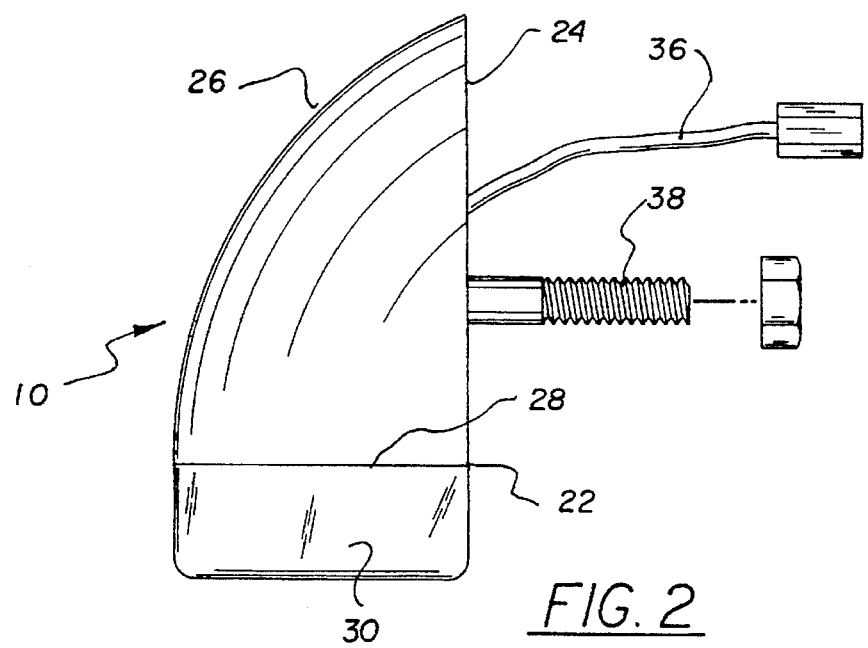
FIG. 2 is a plan view of one of the lights of the present invention.
Figure 3:
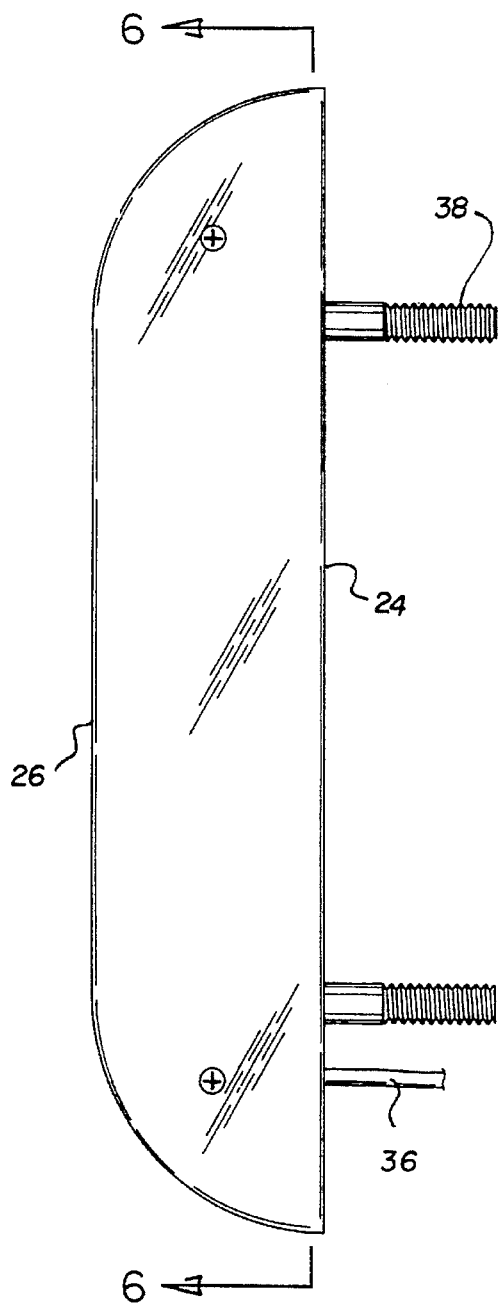
FIG. 3 is a rear elevation view of the present invention.
Figure 4:
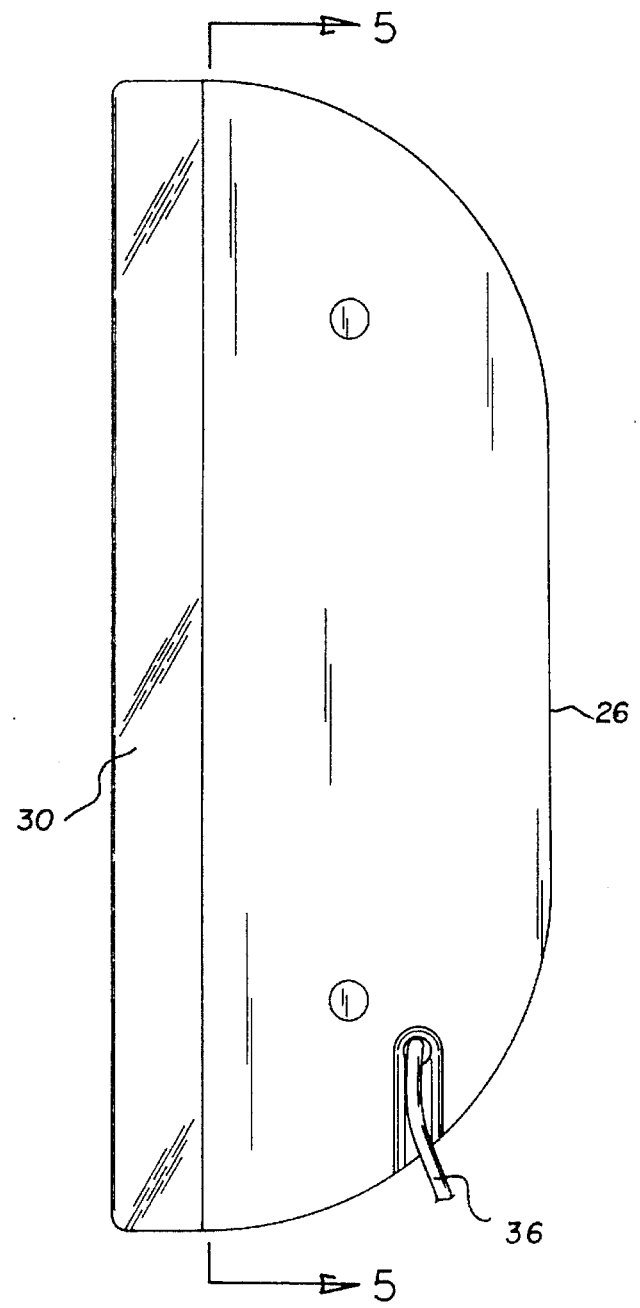
FIG. 4 is a side elevation view of the present invention.
Figures 5, 6:
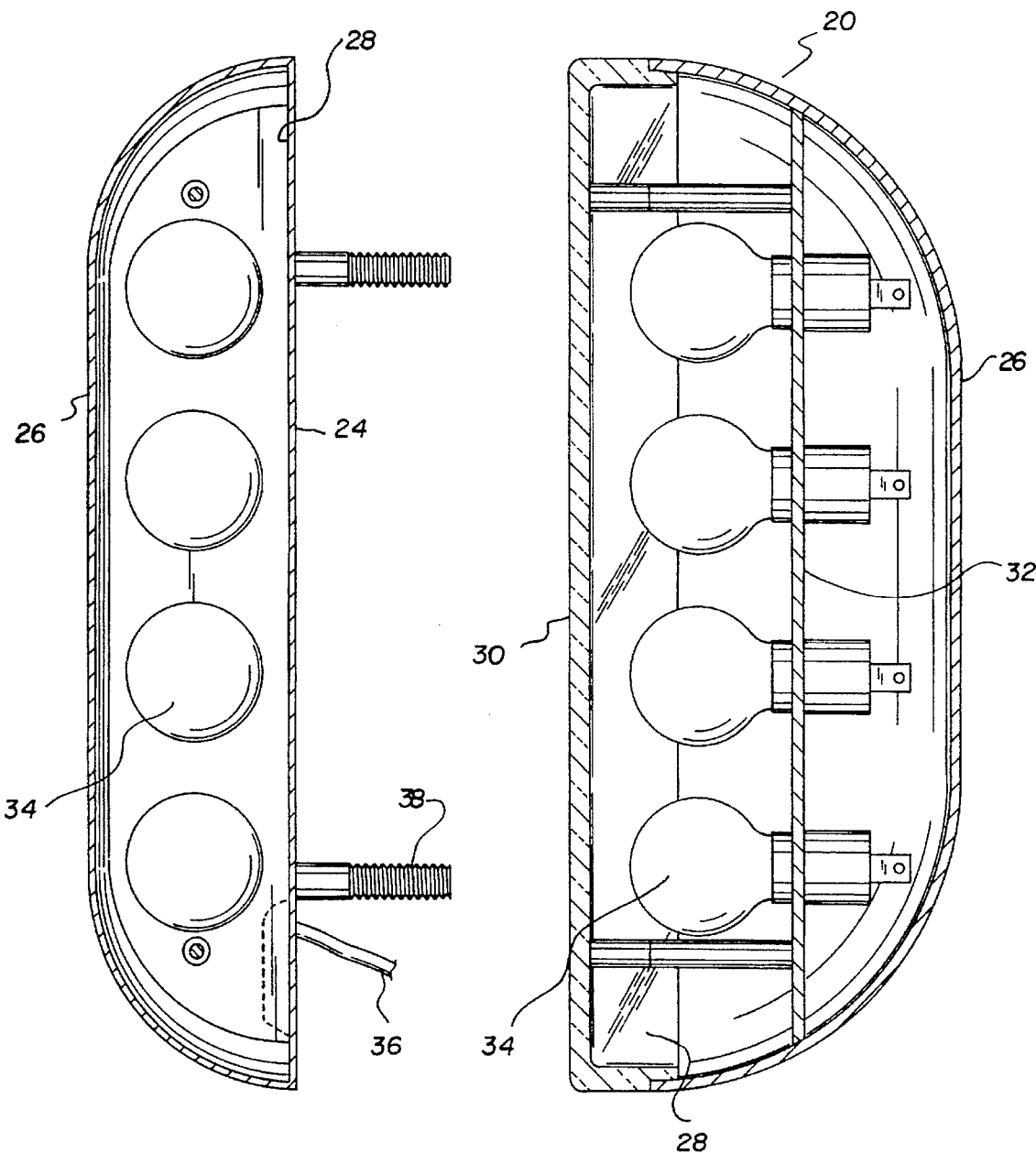
FIG. 5 is a cross-sectional view as taken along line 5—5 of FIG. 4.
FIG. 6 is a cross-sectional view as taken along line 6—6 of FIG. 3.

With reference now to the drawings, and in particular, to FIGS. 1–6 thereof, the preferred embodiment of the new and improved safety brake light for high profile vehicle embodying the principles and concepts of the present invention and generally designated by the reference number 10 will be described.

Specifically, it will be noted in the various Figures that the device relates to a safety brake light for high profile vehicle for providing additional warnings that a vehicle is signaling or stopping. In its broadest context, the device consists of a truck and a plurality of lights. Such components are individually configured and correlated with respect to each other so as to attain the desired objective.

The system 10 includes a truck 12 having a trailer 14 extending rearwardly therefrom. The truck 12 is one of a variety of high profile vehicles used for the system 10. Other high profile vehicles could include school buses, boat trailers, horse trailers, mobile homes in transport and highly positioned vans and RV's.

The central component of the system 10 is the plurality of lights 20. Each of the lights 20 includes a housing 22. The housing 22 has a generally elongated triangular configuration. The housing 22 has a flat interior surface 24, a curved exterior surface 26, and an open rear surface 28. The open rear surface 28 has a cover 30 removably secured thereto. The housing 22 includes an intermediate wall 32 disposed inwardly of the open rear surface 28. Each of the lights 20 has a plurality of light bulbs 34 secured within the intermediate wall 32 in vertical alignment. In the preferred embodiment, the number of light bulbs 34 used is four. The plurality of light bulbs 32 are coupled to a central wire 36 extending outwardly of the housing 22. The central wire 36 is connected electrically directly to an existing wiring that supplies power to the flashers or hazard lights and brake lights of the truck or high profile vehicle. When brakes are applied, turn signals are used, or hazard lights are activated, the light bulbs 32 would illuminate. A pair of securement bolts 38 extend outwardly of the flat interior surface 24 for securement to the trailer 14 of the truck 12 or other high profile vehicle.

The system 10 includes positioning two of the lights 20 on opposing sides of the trailer 14 of the truck 12 at a level consistent with eye level of passenger vehicles and positioning two of the lights 20 on opposing sides of the truck 12 at a level consistent with eye level of trucks and buses.

The main objective of the system 10 would be to serve as a warning light or attention getter when the user of this product is signalling or stopping unexpectedly.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A safety brake light for high profile vehicle for providing additional warnings that a vehicle is signaling or stopping comprising, in combination:

a truck having a trailer extending rearwardly therefrom;

a plurality of lights, each of the lights including a housing, the housing having a generally elongated triangular configuration, the housing having a flat interior surface, a curved exterior surface, and an open rear surface, the open rear surface having a cover removably secured thereto, the cover fabricated of a translucent material, the housing including an intermediate wall disposed inwardly of the open rear surface, each of the lights having a plurality of light bulbs secured within the intermediate wall in vertical alignment, the plurality of light bulbs coupled to a central wire extending outwardly of the housing, the central wire coupling with an existing brake light wire of the truck whereby activation of brakes of the truck will illuminate the plurality of light bulbs thereby providing a rearward illumination for viewing by vehicles travelling behind the truck, a pair of securement bolts extending outwardly of the flat interior surface for securement to the trailer of the truck; and positioning two of the lights on opposing sides of the trailer of the truck at a level consistent with eye level of passenger vehicles and positioning two of the lights on opposing sides of the truck at a level consistent with eye level of trucks and buses.

* * * * *